Patented Nov. 28, 1922.

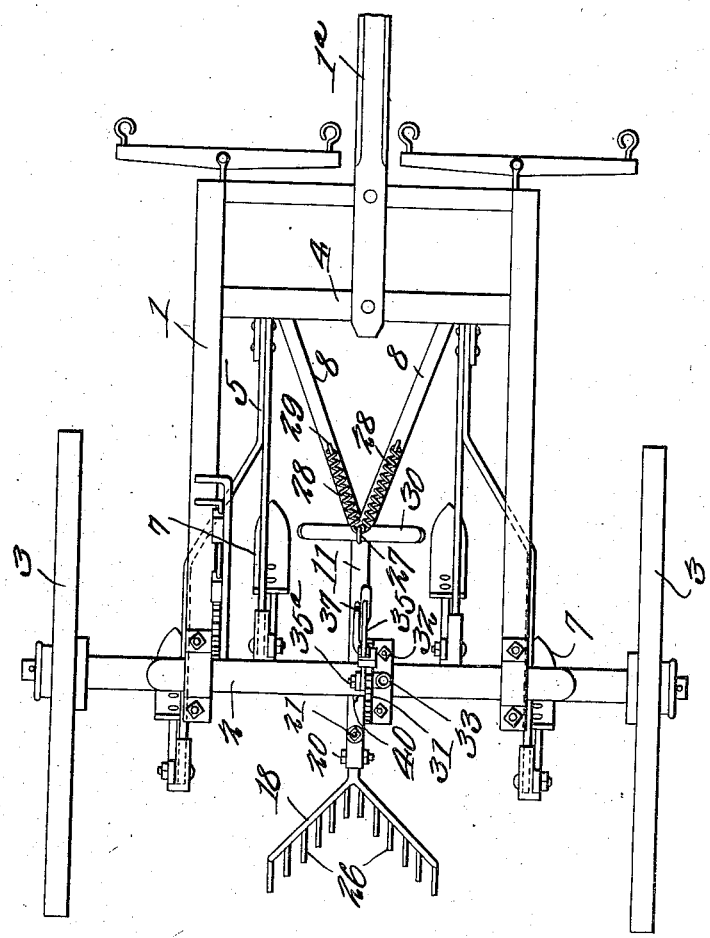

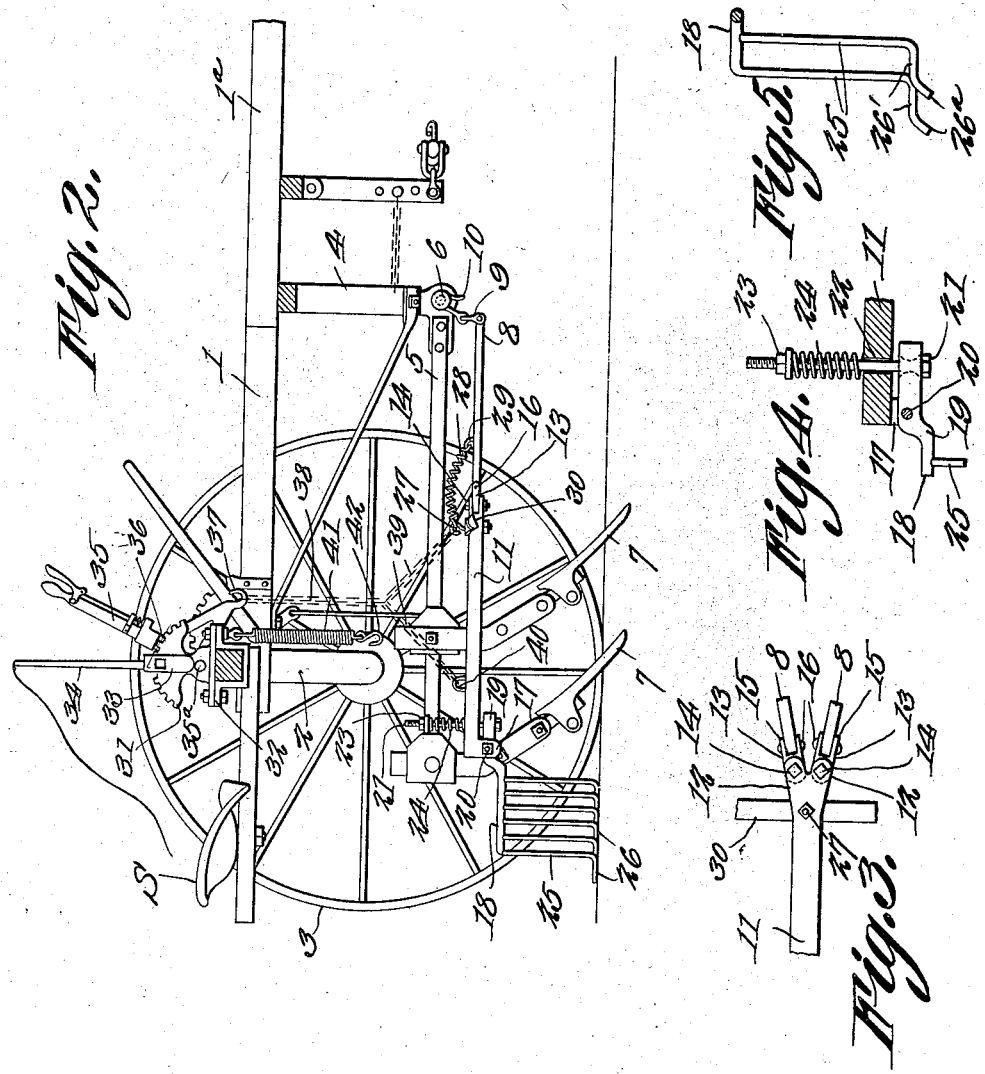

1,437,110

UNITED STATES PATENT OFFICE.

CHAUNCEY BOYD KETTRING, OF MONTEZUMA, OHIO.

CULTIVATOR ATTACHMENT.

Application filed August 5, 1920. Serial No. 401,457.

*To all whom it may concern:*

Be it known that I, CHAUNCEY BOYD KETTRING, a citizen of the United States, residing at Montezuma, in the county of Mercer and State of Ohio, have invented a new and useful Cultivator Attachment, of which the following is a specification.

The present invention appertains to cultivators, and relates more especially to an attachment for corn cultivators.

With the ordinary cultivator, it is not infrequently the case that during the cultivation of the corn, the plants are covered with soil which is objectionable for obvious reasons, and it is the object of the invention to provide an attachment for a cultivator which is operable to remove the surplus soil from the corn or other plants, and which will also serve to harrow the soil adjacent the plants to break up the lumps.

Another object of the invention is to provide novel and improved means for mounting the rake or element which removes the surplus soil from the plants and which breaks up the lumps, the device being in the form of attachment applicable to an ordinary cultivator, and being comparatively simple and inexpensive in construction as well as being thoroughly practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of a cultivator with the attachment applied thereto.

Figure 2 is a side elevation of the attachment applied to the cultivator, portions being broken away.

Figure 3 is an enlarged detail bottom view showing the connection between the beam and bars.

Figure 4 is an enlarged sectional detail illustrating the connection between the rake and beam.

Figure 5 is an enlarged fragmental view of a modified form of rake.

The cultivator illustrated is to be taken as typical only, since the present attachment can be applied to various cultivators, and the cultivator depicted in the drawings embodies a frame 1 attached to an arched axle 2 carried by the ground wheels 3, a tongue 1ª being attached to the frame, and the frame having a forward depending arch or hanger 4 to the ends of which the cultivator beams 5 are pivotally connected by the pivots 6. The cultivator blades 7 are attached to the beams 5 and when the cultivator is drawn astride a row of corn or other plants, the blades 7 loosen the soil at the opposite sides of the row. During the cultivating operation, it is frequently the case that lumps or accumulations of dirt are thrown against the plants, and this necessitates the operator or another person removing the dirt from the plants in order that injury thereto may be avoided. The present attachment is designed to trail slightly in rear of the cultivator blades to remove the surplus dirt and lumps from the plants, and which also break up the lumps adjacent the plants.

The present attachment embodies a pair of rearwardly diverging connecting bars 8 having pivotally attached to their forward or remote ends clevis 9 to which hooks 10 are pivotally connected, whereby said hooks 10 can be engaged with the pivots 6 for connecting the bars 8 with the ends of the arch or hanger 4, thus enabling the attachment to be readily applied to and removed from the cultivator.

A longitudinal floating beam 11 is connected loosely to the rear ends of the bars 8, and to this end the forward end of the beam 11 has a fork 12 whose arms are bifurcated, and couplings 13 are pivoted within the arms of the fork 12, as at 14, whereby the couplings 13 can swing in horizontal planes. The couplings 13 project forwardly and have their forward ends bifurcated to receive the rear ends of the bars 8, as at 15, and the bars 8 are pivoted within the couplings 13, as at 16, whereby the bars 8 and couplings 13 can swing in vertical planes relative to one another. The rear ends of the bars 8 and forward end of the beam 11 are thus connected by universal joints, whereby the beam 11 can swing horizontally and vertically, but will ordinarily tend to trail in a longitudinal position due to the drag created.

The rake is attached to the rear end of the beam 11 and for this purpose, the rear end of said beam has a pair of depending ears 17 for the pivotal connection of the rake. The rake embodies a V-shaped bar or rod 18 whose arms diverge rearwardly, and which is provided at its corner or bend with a forwardly projecting shank 19 pivoted between its ends between the ears 17 by means of a pivot 20. The rake can thus swing vertically.

The rake is spring pressed to normally swing the same downwardly, and to this end, a vertical bolt 21 is engaged loosely through the forward end of the shank 19, said bolt having a lower head seating against the lower surface of the shank 19, and the bolt 21 projects upwardly through an aperture 22 of the beam 11 in front of the ears 17. A nut 23 is threaded upon the upper terminal of the bolt or rod 21, and a coiled wire expansion spring 24 surrounds the bolt 21 and is confined between the nut 23 and beam 11 to normally swing the forward end of the shank 19 upwardly, thereby swinging the rake yieldably downward toward the soil.

The bar 18 of the rake is provided with a series of depending resilient teeth or fingers 25 provided at their lower ends with rearwardly projecting terminals 26. The teeth 25 being arranged in V-shape will reduce to a minimum, the liability of the rake injuring the plants, and furthermore, the teeth will tend to deflect the lumps away from the plants, it being understood that the rake is drawn over the plants so that the plants can pass between the teeth at the corner or elbow of the rake. The terminals 26 are adapted to ride upon the soil to support the rake and to pulverize or break up the lumps.

In the modified form illustrated in Figure 5, the teeth 25 of the rake have the rearwardly projecting terminals 26' provided with downwardly bent spurs 26ª to facilitate the pulverizing of the soil.

The beam 11 and bars 8 are spring pressed relative to one another, and for this purpose a hook 27 has its shank engaged downwardly through the beam 11 adjacent the forward end thereof, and coiled wire expansion springs 28 have their rear ends engaged with the hook 27. The forward ends of the forwardly diverging springs 28 are engaged with eyes or staples 29 carried by the bars 8, and the said springs 28 in tending to expand will swing the beam 11 downwardly relative to the bars 8.

The shank of the hook 27 which is preferably in the form of a bolt, also serves to secure a transverse bar or foot piece 30 upon the beam 11, whereby the operator seated upon the seat S of the cultivator, as seen in Figure 2, can depress the bar 30 for depressing the rake, as will hereinafter more fully appear.

As a means for adjusting the vertical position of the rake, an upwardly projecting toothed segment 31 is carried by a clamp 32 embracing the arched axle 2, and an L-shaped or bell crank lever 35 has its elbow fulcrumed to the segment 31, as at 35ª, the upwardly projecting arm of the lever 35 having a pawl or dog 36 engageable with the teeth of the segment 31 to hold the lever in any adjusted position. The lower forwardly projecting arm of the lever 35 has a terminal hook 37 to which the upper end of a chain 38 is engaged and to the lower end of the chain 38 is connected a pair of diverging chains 39, one of which is connected with the hook 27, and the other of which is engaged with an eye or staple 40 carried by the beam 11 near its rear end. The beam 11 is thus hung from the lever 35, whereby said lever can be adjusted for raising and lowering the beam as desired.

Instead of using the lever 35 and chains 38—39, which will not allow the beam to yield downwardly, a coiled retractile spring 41 can be employed, the upper end thereof being attached to the clamp 32, and the lower end thereof having a hook 42 engageable with the eye 40, whereby the spring 41 will tend to raise the beam 11. The operator in this case, by placing his feet upon the bar 30, can depress the beam 11 as desired for properly applying the rake to the plants and soil.

In operation, it is evident that the rake in trailing from the machine will serve its function in a thoroughly satisfactory manner, it being possible to adjust the beam to raise and lower the rake or to shift the same laterally.

Having thus described the invention, what is claimed as new is:

1. In a device of the class described, a frame; a bar pivoted to the frame for vertical swinging movement; a beam pivoted to the bar for universal swinging movement; spring means for depressing the beam; a rake pivoted to the rear end of the beam; spring means for swinging the rake downwardly; and means under the control of an operator for raising and lowering the beam.

2. In a device of the class described, a rake provided with depending fingers and supplied at its apex with a forwardly presented shank; a beam whereunto the shank is pivoted for vertical swinging movement; spring means carried by the beam and cooperating with the shank to hold the terminals on the soil; and means for supporting the beam pivotally on a vehicle.

3. In a device of the class described, a wheel-mounted frame including a depending hanger; beams pivoted to the hanger; cultivator blades mounted on the beams; rearwardly converging members pivotally mounted at their forward ends on the hanger; a beam connected at its forward end to the rear ends of said members for universal swinging movement; and a rake pivotally mounted on the rear end of the last specified beam and spring-constrained to cooperate with the soil, the rake being located between and to the rear of the blades.

In testimony that I claim the foregoing as my own, I have hereto affixed my signature in the presence of two witnesses.

CHAUNCEY BOYD KETTRING.

Witnesses:
   VIOLO A. BECKMAN,
   OSCAR STAFFORD.